United States Patent [19]

Acker et al.

[11] 4,080,007

[45] Mar. 21, 1978

[54] BRAKE-FORCE CONTROLLER FOR VEHICLES

[75] Inventors: Bernd Acker, Esslingen-Mettingen; Hubertus Christ; Udo Reber, both of Stuttgart, all of Germany

[73] Assignee: Daimler-Benz Aktiengesellschaft, Germany

[21] Appl. No.: 748,881

[22] Filed: Dec. 9, 1976

[30] Foreign Application Priority Data

Dec. 9, 1975 Germany .............................. 2555319

[51] Int. Cl.² .............................................. B60T 8/08
[52] U.S. Cl. ...................................... 303/104; 303/100
[58] Field of Search ................................ 303/104, 100

[56] References Cited

U.S. PATENT DOCUMENTS

| 3,663,069 | 5/1972 | Perry ..................................... 303/104 |
| 3,664,713 | 5/1972 | Riordan ................................. 303/104 |
| 3,744,852 | 7/1973 | Riordan ................................. 303/104 |
| 3,980,350 | 9/1976 | Oberg ................................... 303/100 |

FOREIGN PATENT DOCUMENTS

2,219,836  10/1973  Germany .............................. 303/104

*Primary Examiner*—Trygve M. Blix
*Assistant Examiner*—Reinhard J. Eisenzopf
*Attorney, Agent, or Firm*—Craig & Antonelli

[57] ABSTRACT

A brake force controller for vehicles, particularly automotive vehicles, with a back-control of the brake pressure of the pressure control medium for enabling various control conditions in response to input signals. The input signals are formed in accordance with sensed conditions including at least one of circumferential wheel force, pressure in the master brake cylinder, pressure in the wheel brake cylinder, a predetermined critical or limit pressure in the wheel brake cylinder, the pressure in the wheel brake cylinder when the maximum is exceeded which is stored, and first and second time intervals corresponding to the length of time predetermined control conditions are effective, respectively. In accordance with the signals, the back-control is effective for enabling control conditions of rapid pressure increase, pressure decrease, pressure maintained and gradual pressure increase.

12 Claims, 12 Drawing Figures

FIG.1
PRIOR ART

| | B | CONTROLLER CONDITION | VALVE POSITION EFFECTS | SIGNAL |
|---|---|---|---|---|
| 0 - I | 1 | a | PRESSURE INCREASE, RAPID | A |
| I - II | 0 | b | PRESSURE DECREASE | E |
| II - III | 1 | c | PRESSURE MAINTAINING PHASE | PC |
| III - IV | 0 | d | PRESSURE INCREASE, RAPID | A |
| IV - V | 1 | e | PRESSURE INCREASE, GRADUAL | nPG |

BRAKE-FORCE CONTROLLER FOR VEHICLES

The present invention relates to a brake force controller for vehicles, particularly automotive vehicles, with a back-control (reduction control) of the brake pressure of the pressure control medium causing a reduction of the brake pressure when a maximum circumferential wheel force effective on the wheel is exceeded and with a disengagement of the back-control when the circumferential wheel force decreases again after the maximum valve has been passed in the reverse direction, wherein the engagement and disengagement of the back-control of the brake pressure are controlled by signals which are formed by the signs of the derivatives with respect to time of the circumferential force and of the brake pressure. Further, the back-control of the brake pressure with an increasing brake pressure and a decreasing circumferential wheel force is engaged only if previously the circumferential wheel force and the brake pressure were on the increase, and wherein the back-control of the brake pressure with a decreasing brake pressure and a decreasing circumferential wheel force is disengaged only if previously the circumferential wheel force was on the increase with the brake pressure being on the decrease.

Back-control is a brake pressure control which is responsive to at least a first sensed dynamic condition for engaging to cause a reduction of the brake pressure and which is responsive to at least a second sensed dynamic condition for disengaging to cause reapplication of the brake pressure so as to prevent skidding of the vehicle as a result of the braking operation. DOS [German Unexamined Laid-Open Patent Application] U.S. Pat. No. 2,140,658 discloses a brake force regulator with a back-control of the brake pressure when a maximum circumferential wheel force effective on the wheel has been exceeded, and with a disengagement of the back-control upon a renewed decrease in the circumferential wheel force after the maximum has been passed in the reverse direction, wherein the engagement and disengagement of the back-control of the brake pressure is controlled by signals formed, taking into consideration the hysteresis effect of the control operation, by the signs of the derivatives with respect to time, e.g. + or —, of the circumferential force and of the brake pressure. This control system is also disclosed in commonly assigned copending application Ser. No. 664,031, now U.S. Pat. No. 4,043,608 issued Aug. 23, 1977 the subject matter of which is incorporated by reference herein.

In DOS No. 2,219,836, the above-described engagement/disengagement control is additionally broadened by two further conditions, namely "gradual pressure rise" and "pressure maintaining phase". Besides, two special cases occurring due to disturbances in the circumferential force and possibilities for overcoming same have been described in such publication.

In case of full brake application, which is considered exclusively in the above-cited patent application publications, as well as in all previous inventions in the field of the anti-locking brake systems, a control operation in accordance with the derivatives with respect to time of the circumferential force is actually sufficient. Partial brake applications have not been taken into account heretofore, and also special cases which can occur in certain operating conditions have been considered heretofore either not at all or only to a very limited extent.

It is therefore an object of the invention to provide a brake force controller which takes all of these aforementioned cases and operating conditions into account and, in this way, renders the correct decisions in all possible situations, taking the relationship between the tire and the road into account.

This object is attained in accordance with the present invention by providing that, in dependence on digital signals $B$, $P_1$, $P_2$, $P_S$, $Z_1$ and $Z_2$ representing variables and formed from the input variables of circumferential force; pressure in the master brake cylinder; pressure in the wheel brake cylinder; a predetermined critical pressure in the wheel brake cylinder; the pressure in the wheel brake cylinder stored at the time when the maximum is exceeded; a first time interval for having the controller remain in a control condition; a second time interval for having the controller remain in two successive control conditions, respectively, as well as a timing or clocking signal for determining these time intervals. It is possible to initiate the control conditions $a$, $d$ and $f$: "Rapid Pressure Increase",
$b$: "Pressure Decrease",
$c$ and $g$: "Pressure Maintained" and
$e$: "Gradual Pressure Increase", in accordance with a control system corresponding to the flow chart illustrated in FIG. 8.

The digital signals or variables include $B$, $P_1$, $P_2$, $P_S$, $Z_1$ and $Z_2$ where

| | | | |
|---|---|---|---|
| $B = 1$ | if $dU/dt > 0$ | | |
| $B = 0$ | if $dU/dt < 0$ | | |
| $B_n = B_{n-1}$ | if $dU/dt = 0$ | with $U$ being circumferential force | |
| $P_1 = 1$ | if $P_H < P_R$ | with $P_H$ being master brake cylinder pressure and $P_R$ wheel brake cylinder pressure | |
| $P_1 = 0$ | if $P_H \geq P_R$ | | |
| $P_2 = 1$ | if $P_R - P_{Gr} < 0$ | | |
| $P_2 = 0$ | if $P_R - P_{Gr} \geq 0$ | with $P_{Gr}$ being a lower pressure limit value for the wheel brake cylinder; | |
| $P_S = 1$ | if $P_R - P_{Sp} \geq 0$ | | |
| $P_S = 0$ | if $P_R - P_{Sp} < 0$ | with $P_{Sp}$ being the pressure value in the wheel brake cylinder which is stored when the maximum is exceeded | |
| $Z_1 = 0$ | if $t_d \leq t_{max\,1}$ | | |
| $Z_1 = 1$ | if $t_d > t_{max\,1}$ | with $t_d$ being the time interval the controller is in condition d and $t_{max\,1}$ is a predetermined maximum time interval | |
| $Z_2 = 0$ | if $t_b + t_c \leq t_{max\,2}$ | | |
| $Z_2 = 1$ | if $t_b + t_c > t_{max\,2}$ | with $t_b$ and $t_c$ being the time interval the controller is in condition b and subsequently in condition c, respectively, and $t_{max\,2}$ is a predetermined maximum time interval | |

In accordance with the present invention, a variation of the control system is possible, according to which a signal $P_3$ is provided, replacing the signal $Z_1$, wherein an additional, freely selectable pressure threshold or limit value $P_{SCH}$ is provided. $P_3 = 1$ if $P_R - P_{SCH} < 0$ and $P_3 = 0$ if $P_R - P_{SCH} > 0$. If this pressure threshold is made identical to the predetermined critical pressure limit value $P_{Gr}$, then the signal $Z_1$ can be replaced by signal $P_2$.

Figure 4:
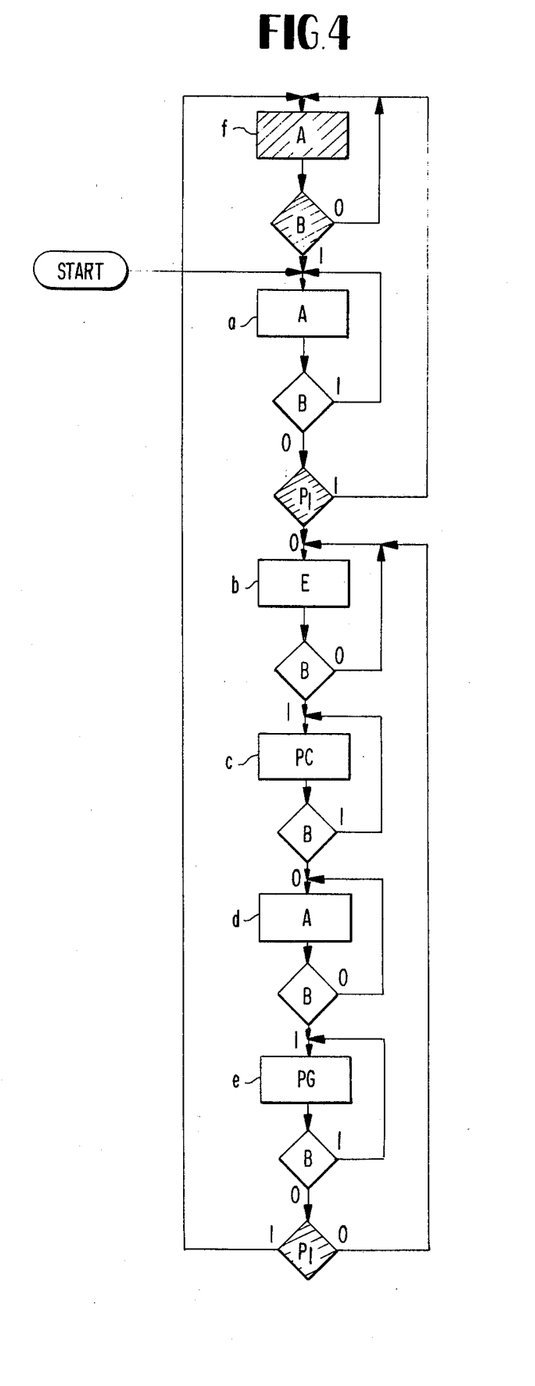
FIG. 4 is a flow chart of a first, expanded brake force controller.
Figure 7:
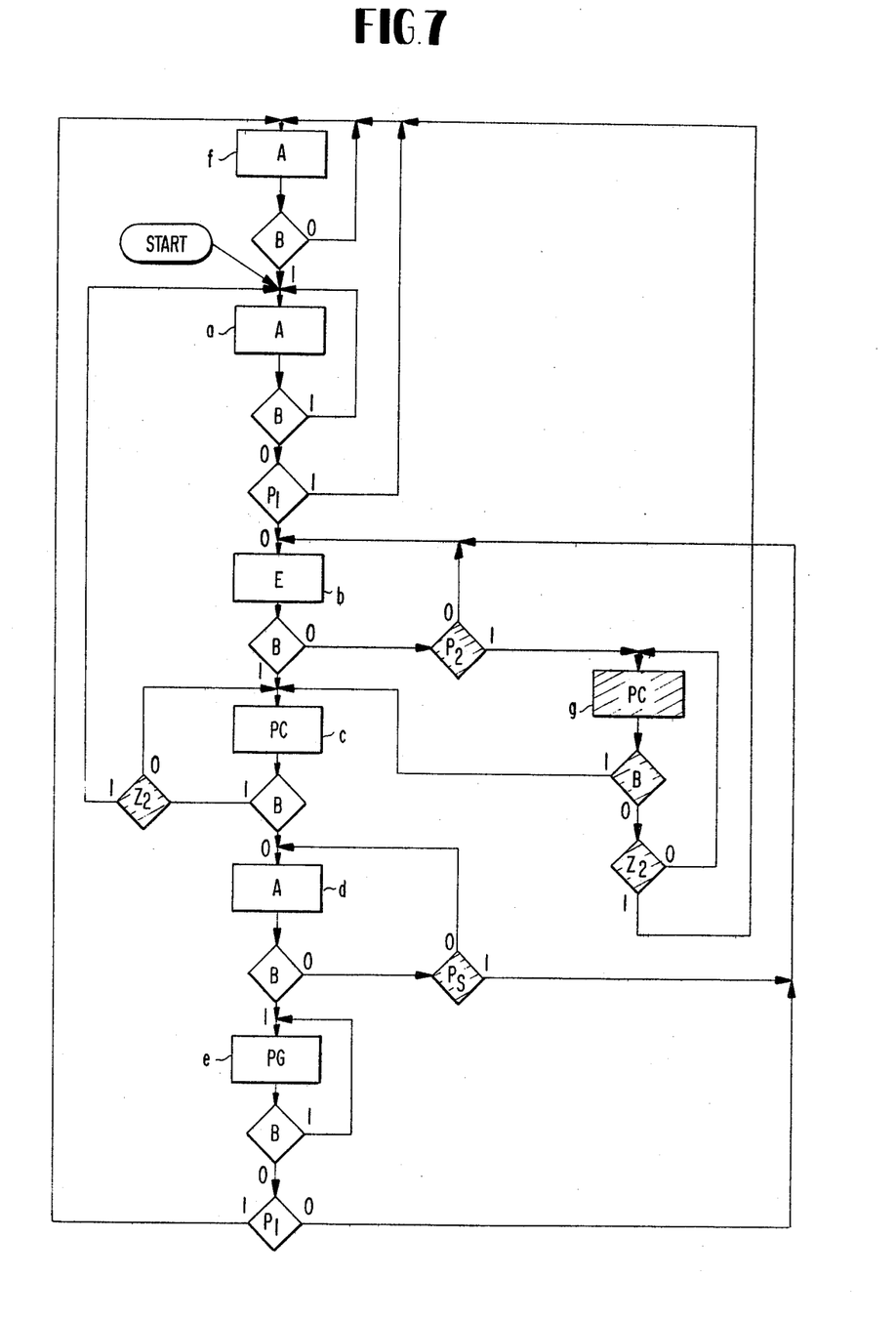
FIG. 7 is a flow chart of a second, expanded brake force controller.

Additionally, it is unnecessary to utilize all of the above noted signals for control purposes with simpler brake force controllers as illustrated in FIG. 4 and FIG.

7, and described herein being operable to effect braking control.

These and further objects, features and advantages of the present invention will become more obvious from the following description when taken in connection with the accompanying drawings which show, for purposes of illustration only, several embodiments in accordance with the present invention; and wherein.

Figure 1:
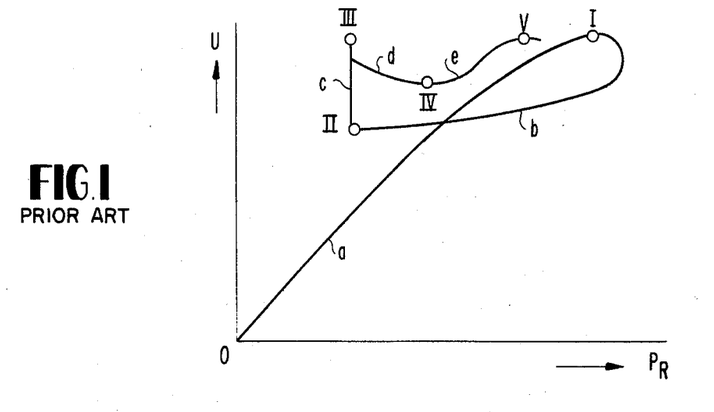
FIG. 1 illustrates a curve of the circumferential force in dependence on the pressure in the wheel brake cylinder in the conventional brake force controller.
Figure 2:
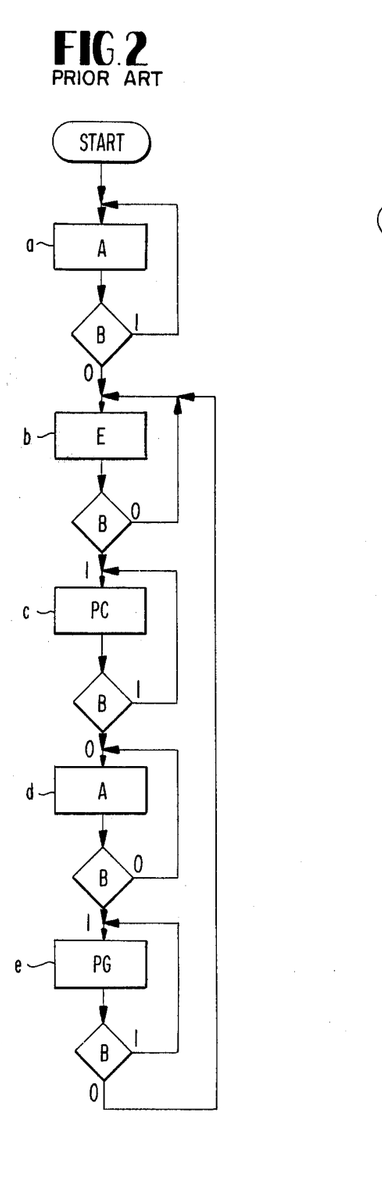
FIG. 2 shows the associated structural arrangement of the controller in the form of a flow chart.

Referring now to the drawings wherein like reference designations are utilized to designate like parts throughout the several views, if a brake force controller is constructed in accordance with the aforementioned known published patent applications, then the sign of the signal $dU/dt$ alone is sufficient — considering the case of full brake application. Such a brake force control is shown in FIG. 2 as a flow chart. FIG. 1 shows the control curve for the circumferential force U as a function of the pressure in the wheel brake cylinder $P_R$.

If, upon a full brake application, the brake pressure $P_R$ rises, starting with 0, then the circumferential force U is likewise on the increase, i.e. $dU/dt$ is positive, and reaches the maximum at point I. Thereafter, the circumferential force decreases such that $dU/dt$ becomes negative. This is the signal for the controller to lower the pressure $P_R$ is the wheel brake cylinder. Due to the inertia of the system, however, the circumferential force continues to decrease in a direction toward the locking condition, reaching its lowest value at point II. Thereafter, the circumferential force rises again, $dU/dt$ becomes positive. This is the signal for the controller to maintain the pressure in the wheel brake cylinder at a constant value. At point III, the circumferential force (from the direction toward locking) has again reached its maximum. After passing the maximum in the reverse direction, the circumferential force decreases again, and with $dU/dt$ being smaller than zero or negative, the brake pressure in the wheel brake cylinder rises again. Once more, the circumferential force does not immediately respond, due to the inertia of the system, but rather drops further to point IV. Only at this point in time, $dU/dt$ again becomes larger than zero or positive. This is the signal for the controller to allow the pressure in the wheel brake cylinder to rise only gradually up to point V. At this point, the circumferential force has again reached its maximum. Thus, the control cycle has been traversed, which can be repeated as often as desired. FIG. 2 shows the associated flow chart of the controller in the form of a digital operational circuit wherein the Boole's variable B is defined so that:

$B = 1$ if $dU/dt > 0$ and
$B = 0$ if $dU/dt < 0$

With $dU/dt = 0$, the previously fed signal continues to be applied.

Furthermore, the symbols and signals are as follows:
Signal A (conditions *a* and *d*): "Rapid Pressure Increase",
Signal E (condition *b*): "Pressure Decrease",
Signal PC (condition *c*): "Pressure Maintaining Phase", and
Signal PG (condition *e*): "Gradual Pressure Increase".

As shown, the flow chart utilizes rectangular blocks for the brake control signals with the control condition being shown by lead lines and diamond-shaped blocks for the input variables or signals which determine the subsequent control condition or operation.

Figure 3:
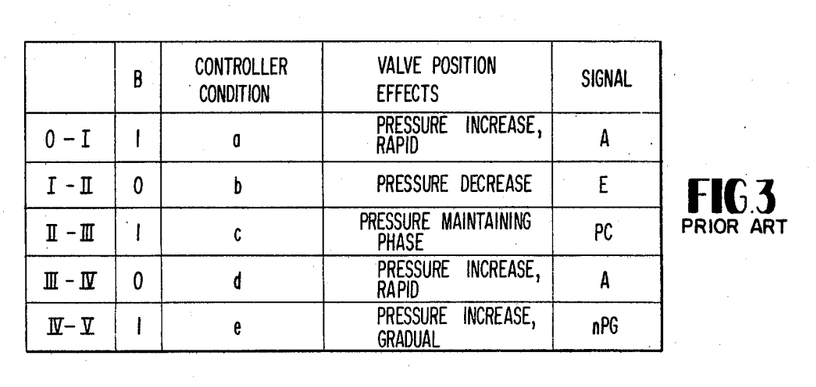
FIG. 3 shows the associated table of the controller conditions and valve position.

During the period of time 0 I, with $B = 1$, i.e. $dU/dt > 0$, condition *a* is present with Signal A being generated. After passing the maximum, during the period of time I-II, $dU/dt$ changes its arithmetic sign, and B becomes equal to zero; the controller passes over into condition *b*. At point II, $dU/dt$ again changes its arithmetic sign, and B becomes equal to 1; the controller passes over into condition *c*, which is the "pressure maintaining phase". During the course of the control cycle, B changes its value twice more, and the controller passes successively to the condition *d*, "rapid pressure increase" and condition *e*, "gradual pressure increase". As can be seen from the flow chart, only the variable B is thus responsible for changes in the controller condition. FIG. 3 represents the aforementioned relationships in the form of a table.

Most of the inventions always assume a full brake application in their control principle. However, considering also partial brake application, two possible causes exist if, in condition *a* or *e*, the circumferential force increases with a rise in the pressure, i.e. if B has the value 1 and thereafter $B = 0$.

1. The circumferential force has passed its maximum in the direction toward locking and becomes smaller; the controller enters condition *b* (previous case of full brake application).

2. The driver relieves the master brake cylinder and thereby lowers the pressure in the wheel brake cylinder. Therefore, the brake torque becomes smaller than the effective friction moment, the wheel accelerates, the slip λ decreases, along with the circumferential force U.

Since the controller, in the second case (2), must not enter condition *b*, a distinction must be made between these two cases which are different in principle. For this purpose, a new condition *f* is introduced having the same valve position as in condition *a*. As a signal for this distinction, the variable $P_1$ is employed.

In the same way as, in the known published patent applications, the derivative with respect to time of the brake pressure is utilized for control purposes which variable could also be employed as the signal for $P_1$. However, a construction which is more simply realized is the comparison of the pressure $P_H$ of the master brake cylinder with the pressure $P_R$ in the wheel brake cylinder. In the former case (case 1), $P_H > P_R$ and in the latter case (case 2), $P_H < P_R$. Thus, by defining $P_1 = 1$ if $P_H < P_R$ and
$P_1 = 0$ if $P_H \geqq P_R$, the expanded flow chart of FIG. 4 is obtained. In this flow chart, as also in subsequent FIGS. 7 and 8, the expansions are compared to the preceding flow charts have been emphasized by shading or hatching.

Therefore, in accordance with FIG. 4, if in condition $a$ or $e$, B becomes zero, the variable $P_1$ will determine whether the controller enters condition $b$ or $f$. In case of a partial brake application, the controller assumes condition $f$, on account of $P_1 = 1$, and the connection between the master and wheel brake cylinders remains open (signal A). With a renewed increase in the circumferential force, the controller again assumes condition $a$. In case of full brake application, the controller assumes condition $b$ due to $P_1 = 0$, whereby the pressure in the wheel brake cylinder is lowered by the signal E.

As mentioned in DOS No. 2,219,836, circumferential force changes and thus changes in the signal or variable B can occur during the course of a braking operation, also by means of $\mu$-jumps, i.e. fluctuations in the coefficient of friction. In order to ensure a correct progression of the control procedure in spite of this occurrence, all of the possibilities of a change in $\mu$ must be systematically investigated. Starting with a specific $\mu$, $\lambda$-curve $\mu a\ (\lambda)$ — correlation between coefficient of friction and slip — then FIG. 5 demonstrates that, in principle, only the indicated points 1 through 8 can be considered as the maximum of a new $\mu$, $\lambda$-curve $\mu_n(\lambda)$. In this connection, at the instant of the $\mu$-jump on the starting curve $\mu a\ (\lambda)$, three different points must be distinguished. The starting point can lie on the ascending branch of the $\mu$, $\lambda$-curve, on the maximum, or on the descending branch. Correspondingly, three different end points are possible on the new $\mu$, $\lambda$-curve. Considering furthermore that in the starting point as well as in the final point the derivative with respect to time of the pressure in the wheel brake cylinder can be $dP_R/dt$ 0, then, after multiplying all enumerated possibilities, 648 cases to be distinguished are obtained, among which, however, several are physically impossible, so that finally only 392 cases must be investigated also with respect to different controller conditions.

With the aid of the flow chart, a check can be carried out whether these cases are being processed by the logic control circuit in the desired manner.

It has been found that the critical cases can be reduced to four special cases which are different in principle, where the controller can react falsely and thus should be expanded.

SPECIAL CASE 1

Figure 6A:
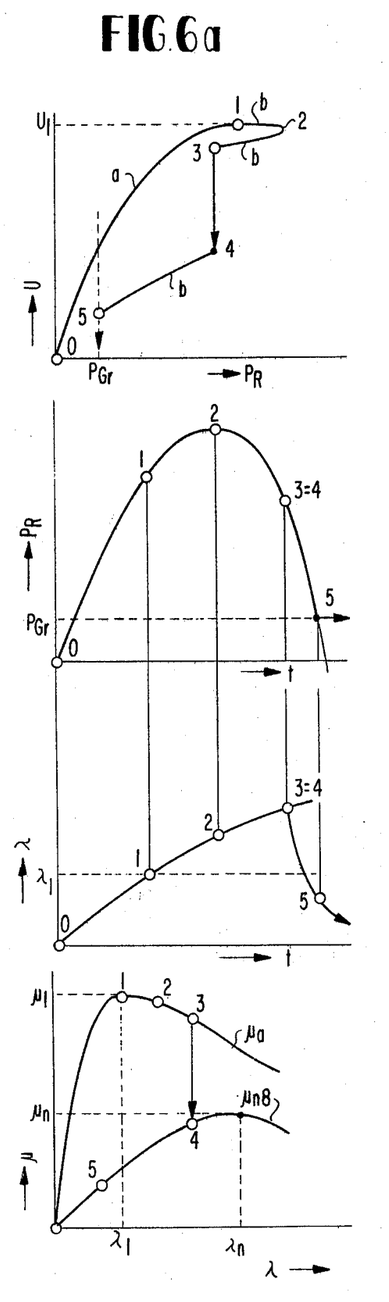
FIG. 6a illustrates curves representative of the controller behavior in accordance with special case 1.

The controller is in condition $b$ with $B = 0$ and $dP_R/dt < 0$. As shown in FIG. 6a, the $\mu$-jump takes place from the descending branch of the old $\mu$-curve $\mu_a$ (point 3) to the ascending branch of the new $\mu$-curve $\mu_{n8}$ (point 4).

The variable B does not change and retains the value 0. Therefore, the controller remains in condition $b$ and, on the basis of the existing valve position determined by signal E, the pressure $P_R$ is fully lowered, so that the wheel can accelerate until it executes a pure rolling motion and the circumferential force U becomes 0. Since B remains equal to 0, there is no possibility for the controller to leave condition $b$. Thus, a renewed increase of the pressure in the wheel brake cylinder is impossible.

To avoid this undesirable behavior, a lower pressure limit $P_{Gr}$ for the wheel brake cylinder is determined, and the pressure in the wheel brake cylinder $P_R$ is never to be lowered below this pressure limit in condition $b$. For this purpose, the additional signal or variable $P_2$ is introduced in controller condition $b$, wherein $P_2 = 1$ if $P_R - P_{Gr} < 0$ and
$P_2 = 0$ if $P_R - P_{Gr} \geqq 0$ In FIG. 6a, this controller behavior is shown in detail by means of the curves $U(P_R)$, $P_R(t)$, $\lambda\ (t)$, and $\mu(\lambda)$, such that further explanation is unnecessary.

SPECIAL CASE 2

Figure 6B:
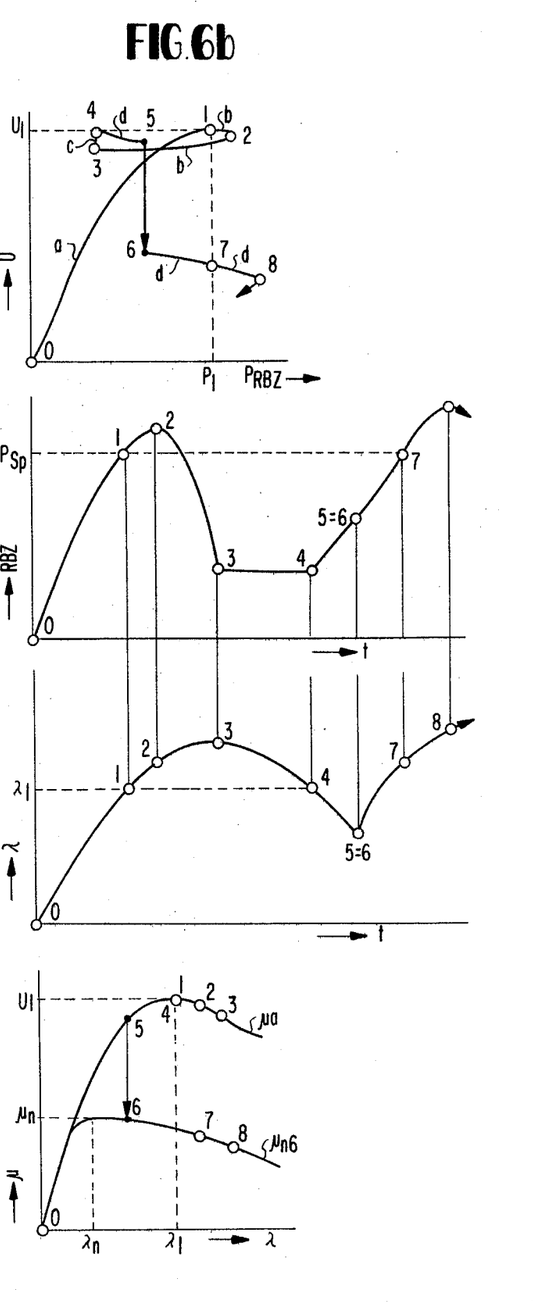
FIG. 6b illustrates curves representative of the controller behavior in accordance with special case 2.

The controller is in condition $d$ with $B = 0$ and $dP_R/dt > 0$, and the $\mu$-jump takes place in the downward direction as shown in FIG. 6b from the ascending branch of the old $\mu$-curve $\mu_a$ (point 5) to the descending branch of the new $\mu$-curve $\mu_{n6}$ (point 6).

The variable B is not changed in this case, either, and retains the value 0. Thus, the controller remains in condition $d$ and, on the basis of existing valve position determined by signal A, the wheel enters the locking condition.

In this case, it is necessary to lower the pressure in the wheel brake cylinder, i.e. the controller must jump into condition $b$. The trigger signal for this purpose is the variable $P_S$, wherein $P_S = 1$ if $P_R - P_{Sp} \geqq 0$ and
$P_S = 0$ if $P_R - P_{Sp} < 0$ and wherein $P_{Sp}$ is the pressure in the wheel brake cylinder which is stored when the maximum is exceeded.

In FIG. 6b, this controller characteristic is illustrated analogously to FIG. 6a. Respectively upon passing the maximum of the $\mu$-curve (point 1), the magnitude of the pressure $P_{Sp}$ present in the wheel brake cylinder at that time is stored. During the further progression of the control cycle, this stored pressure magnitude in condition $d$ is then compared with the actual magnitude of pressure $P_R$. In the normal control case, $P_R$ is always smaller than the stored pressure $P_{Sp}$ in condition $d$, i.e. starting with point 4. However, in special case 2, starting with point 7, the pressure magnitude $P_R$ becomes higher than $P_{Sp}$, i.e. the variable $P_S$ assumes the value 1.

SPECIAL CASE 3

Figure 6C:
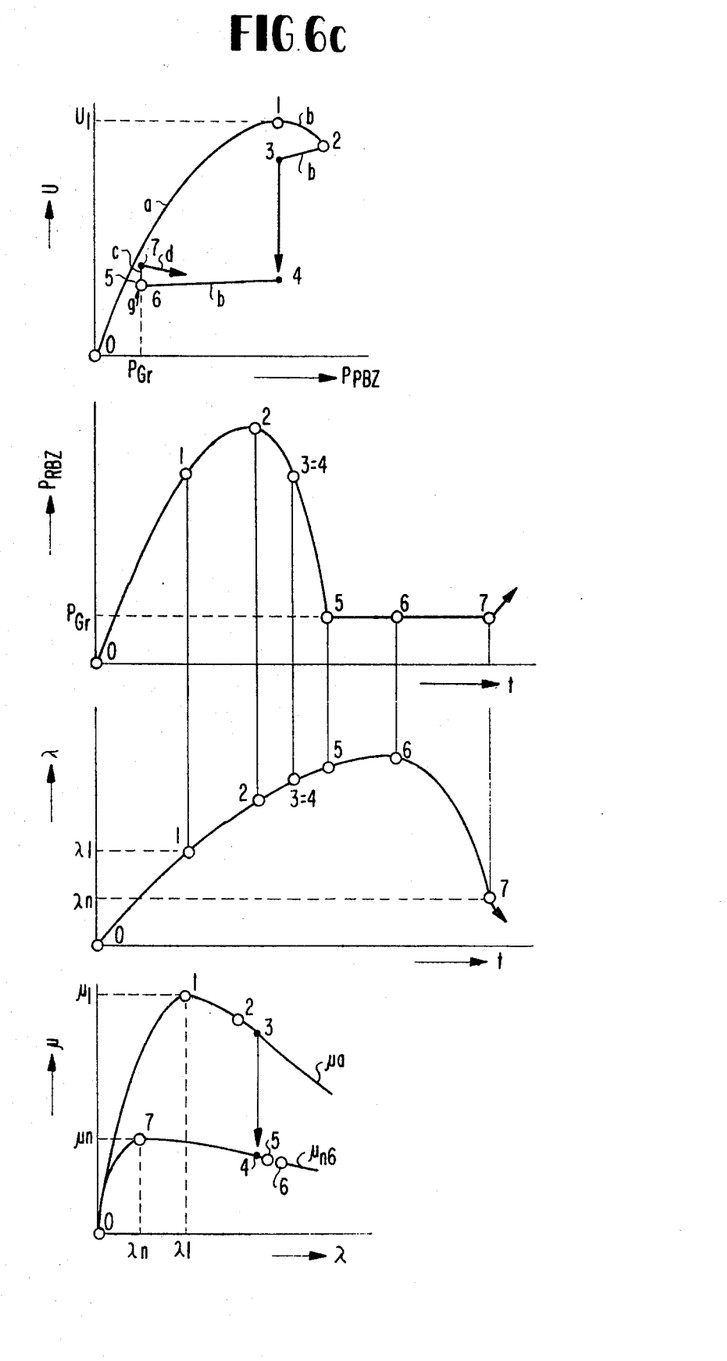
FIG. 6c illustrates curves representative of the controller behavior in accordance with special case 3.

The controller is in condition $b$, exactly as in special case 1, with $B = 0$ and $dP_R/dt < 0$. The $\mu$-jump, however, must take place as shown in FIG. 6c from the descending branch of the old $\mu$-curve $\mu_a$ (point 3) to the descending branch of the new $\mu$-curve $\mu_{n6}$ (point 4). Variable B does not change in this case, either, and retains the value 0. Therefore, the controller remains in condition $b$ and, exactly as in special case 1, the pressure $P_R$ is lowered to $P_{Gr}$ until $P_2 = 1$. If now the controller jumps into condition $f$, as provided for special case 1, then the wheel would lock immediately, since in this condition the valve unit is in the position determined by signal A. However, due to special case 1, the controller must not remain in condition $b$ with the associated valve position determined by signal E, either. A possibility to be considered would be the valve position determined by signal PC, the pressure maintaining phase. However, since PC has heretofore been in conformance with $B = 1$ only in condition $c$, the controller must not be allowed to jump to $c$, for inasmuch as B has the value 0, the controller would immediately jump further into condition $d$ and the wheel would then assume its locked position anyway. For this reason, it is necessary to introduce an additional controller condition $g$ wherein the valve position determined by signal PC is to be set with $B = 0$. As shown in FIG. 6c, the slip $\lambda$ becomes smaller again starting with point 6; the circumferential force U is again on the increase, and with $B = 1$, condition $g$ is replaced by condition $c$.

SPECIAL CASE 4

Figure 6D:
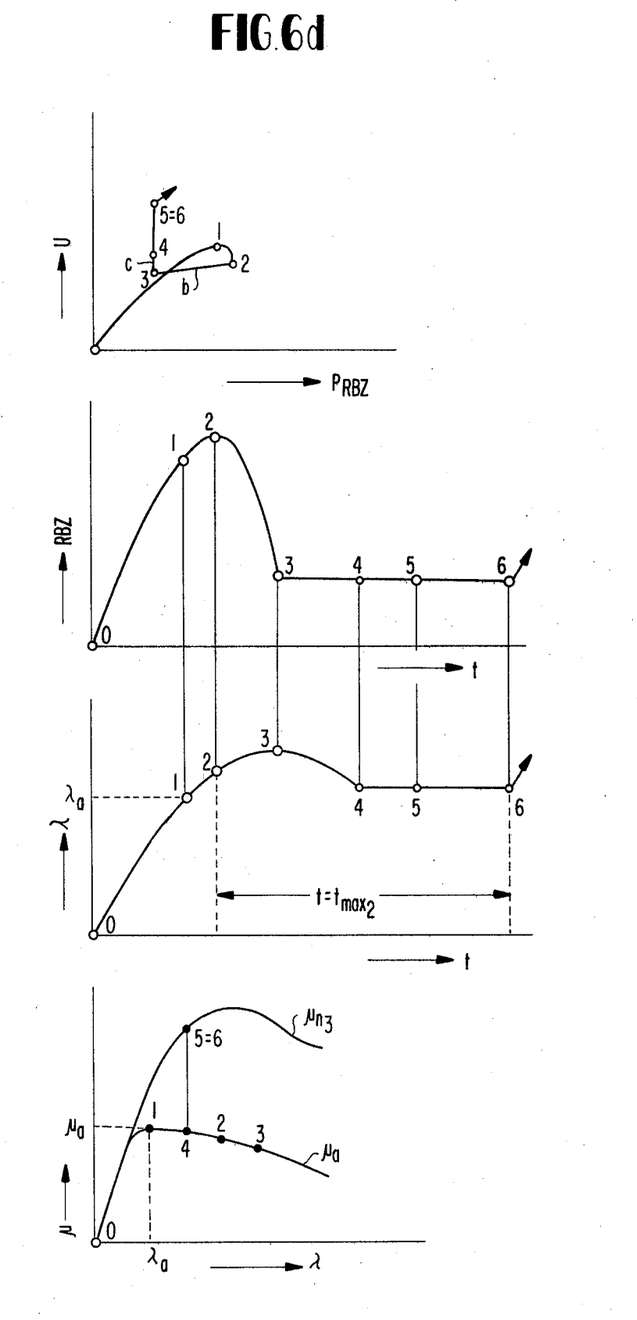
FIG. 6d illustrates curves representative of the controller behavior in accordance with special case 4.

The controller is in condition $c$ with $B = 1$ and $dP_R/dt = 0$. As shown in FIG. 6d, the $\mu$-jump takes place from the descending branch of the $\mu_a$-curve in the upward direction to the ascending branch of the new $\mu$-curve $\mu_{n3}$. The variable B does not change and retains the value 1. Thus, the controller remains in condition $c$ and on the basis of the existing valve setting determined by signal PC the pressure $P_R$ can neither be increased nor lowered. Therefore, to allow the controller to leave condition $c$ at all, an additional signal is required. Accordingly, a counter is utilized which examines the time during which the controller is in conditions $b$ and $c$, i.e. $t_b + t_c$. This is the time period during which the system is on the unstable, descending branch of the $\mu$, $\lambda$-curve. If this time period becomes longer than a predetermined fixed maximum time $t_{max\,2}$, then a variable $Z_2$ assumes the value 1 where $Z_2 = 0$ if $t_b + t_c \leq t_{max\,2}$ and $Z_2 = 1$ if $t_b + t_{max\,2}$. When $Z_2 = 1$, this means that special case 4 is present, and the controller is then to jump into condition $a$.

However, there is still another possibility for special case 4 to occur. The controller is in condition $g$ with $B = 0$ and $dP_R/dt = 0$, and the $\mu$-jump takes place from the descending branch of the old $\mu$-curve $\mu_a$ in the downward direction to the ascending branch of the new $\mu$-curve $\mu_{n8}$ (FIG. 6a). Also in this instance, the controller can leave condition $g$ by way of the variable $Z_2 = 1$ and can jump correspondingly to $f$.

Figure 5:
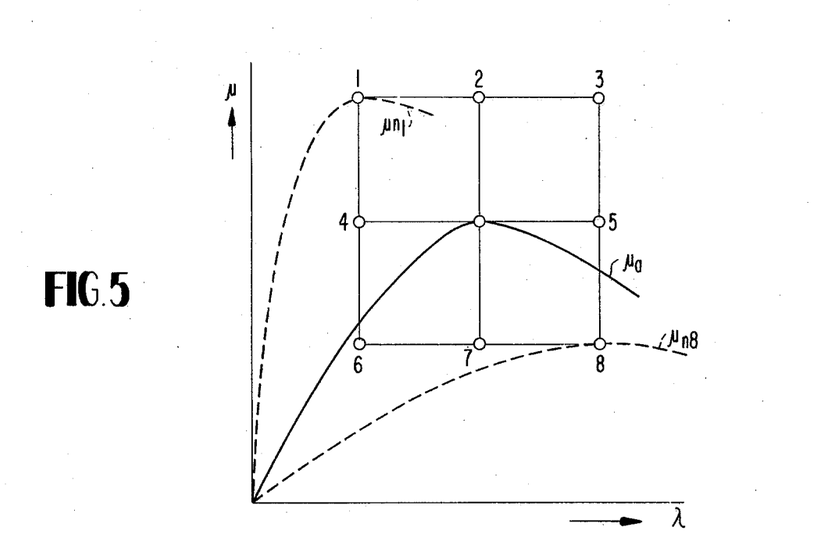
FIG. 5 illustrates curves of the possible μ-jumps upon a change in the road surface.

If a controller is constructed in accordance with the flow chart of FIG. 7, this controller is thus capable of correctly processing the $\mu$-jumps possible according to FIG. 5.

The cases wherein the $\mu$-jump takes place from the maximum of the old $\mu$-curve $\mu_a$ either to the maximum of the new $\mu$-curve $\mu_{n2}$ (not shown) or the new $\mu$-curve $\mu_{n7}$ (not shown) occur extremely rarely. Such curves have the same appearance as the illustrated curves in FIG. 5 except that their maximum lie at points 2 and 7, respectively, and have not been illustrated for sake of clarity. In these cases, the controller behaves as if there had not been any $\mu$-jump at all.

INFLUENCE BY THE DRIVER

The correct processing of influences exerted by the road on the wheel leads, as shown in FIG. 7, to a controller which must be capable of assuming seven different conditions (conditions $a$ - $g$) as discussed above. Since the driver wishes to exert an effect on the brake pressure in the wheel brake cylinder at any point in time, an examination must be made for each controller condition if such influence is possible and if permissible.

In conditions $a$, $d$ and $f$, the operation proceeds on the stable branch of the $\mu$, $\lambda$-curve and thus an influencing of $P_R$ by the driver is permissible and, inasmuch as there is a communication between the master and wheel brake cylinders due to valve position determined by signal A, this is possible as well.

In condition $b$, with valve position E, the controller must lower the pressure in the wheel brake cylinder. Therefore, a pressure increase by the driver is not permissible.

In the other conditions $c$, $e$ and $g$, an additional signal must be introduced to afford the possibility for the driver to affect the controller.

Condition $e$:

In condition $e$, the operation proceeds on the stable branch of the $\mu$, $\lambda$-curve, and the valve position determined by signal PG makes it possible to execute a permissible pressure reduction in the wheel brake cylinder in correspondence with a lowering of the pressure in the master brake cylinder. However, the pressure rise can take place only gradually. There is an instance, though, wherein a rapid increase in pressure is desirable following condition $d$.

If the controller is in condition $d$, and the driver lowers the pressure $P_R$ by releasing the brake pedal, the variable $B = 0$ does not change, and the controller remains in this condition. If the driver now increases the pressure $P_H$ once again, and thus also increases pressure $P_R$, then B becomes 1 and the controller jumps into condition $e$, "gradual pressure increase". However, this is to be avoided is the pressure has already been very greatly reduced. Therefore, another counter is utilized in accordance with the present invention which examines the time during which the controller is in condition $d$, i.e. $t_d$. If a predetermined time interval $t_{max\,1}$ has been exceeded, then a variable $Z_1 = 1$ and the controller jumps into condition $a$, "rapid pressure increase" when B becomes 1 where $Z_1 = 1$ if $t_d > t_{max\,1}$ and $Z_1 = 0$ if $t_d \leq t_{max\,1}$.

In place of the another time counter and variable $Z_1$, it is also possible to choose a variable $P_3$ wherein
$P_3 = 1$ if $P_R - P_{Sch} < 0$ and
$P_3 = 0$ if $P_R - P_{Sch} > 0$ The value $P_{Sch}$ represents a lower pressure threshold for the wheel brake cylinder. The value $P_{Sch}$ can be identical to $P_{G}$, from special case 1, so that the variable $P_2$ can also be utilized as variable $P_3$.

Conditions $c$ and $g$:

If the controller is in condition $c$ or $g$, pressure maintaining phase, and the driver wishes to lower the pressure $P_R$, then the controller can be caused to enter the condition $a$ or $f$, respectively, by the applied variable $P_1 = 1$. Thereby, the brake pressure $P_R$ is lowered in correspondence with the reduction of $P_H$, and a more rapid transgression of the $\mu$, $\lambda$-curve in the other direction is made possible.

If the controller reaches condition $g$ via condition $b$ and the driver has lowered the brake pressure $P_H$, i.e. if $P_1$ has the value 1, then the controller jumps out of condition $g$ already after the next cycle and continues to condition $f$. However, it is more advantageous to cause the controller to enter condition $f$ immediately after having been in condition $b$, with $P_2 = 1$ and $P_1 = 1$, so that the brake mechanism assumes its initial condition more rapidly.

Figure 8:
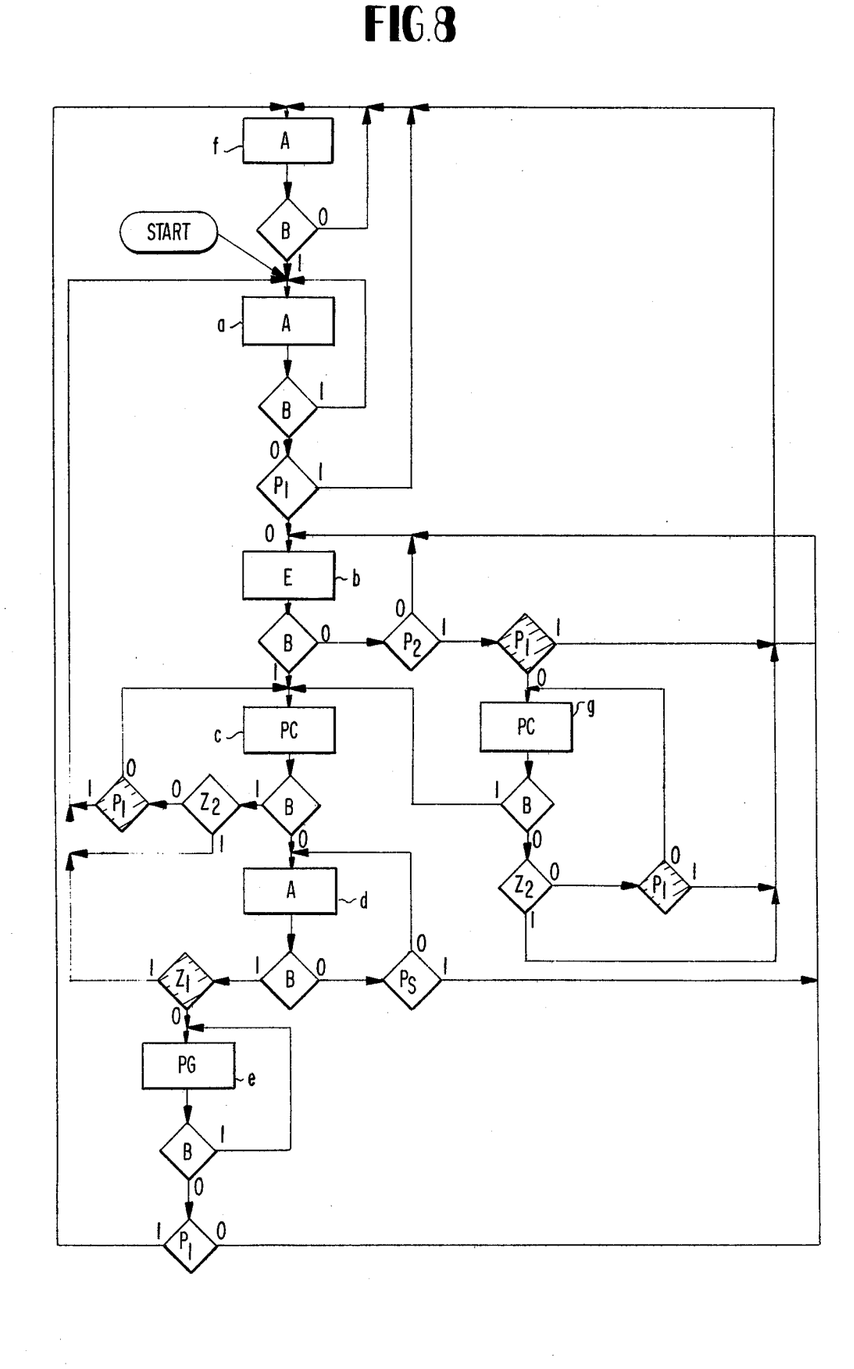
FIG. 8 is a flow chart of a third, expanded brake force controller.

The expansions and improvements necessary due to the influence exerted by the driver are emphasized by shading or hatching in the flow chart of FIG. 8, which illustrates the construction of a brake force controller taking into account the variables and controller operations as discussed herein.

Figure 9:
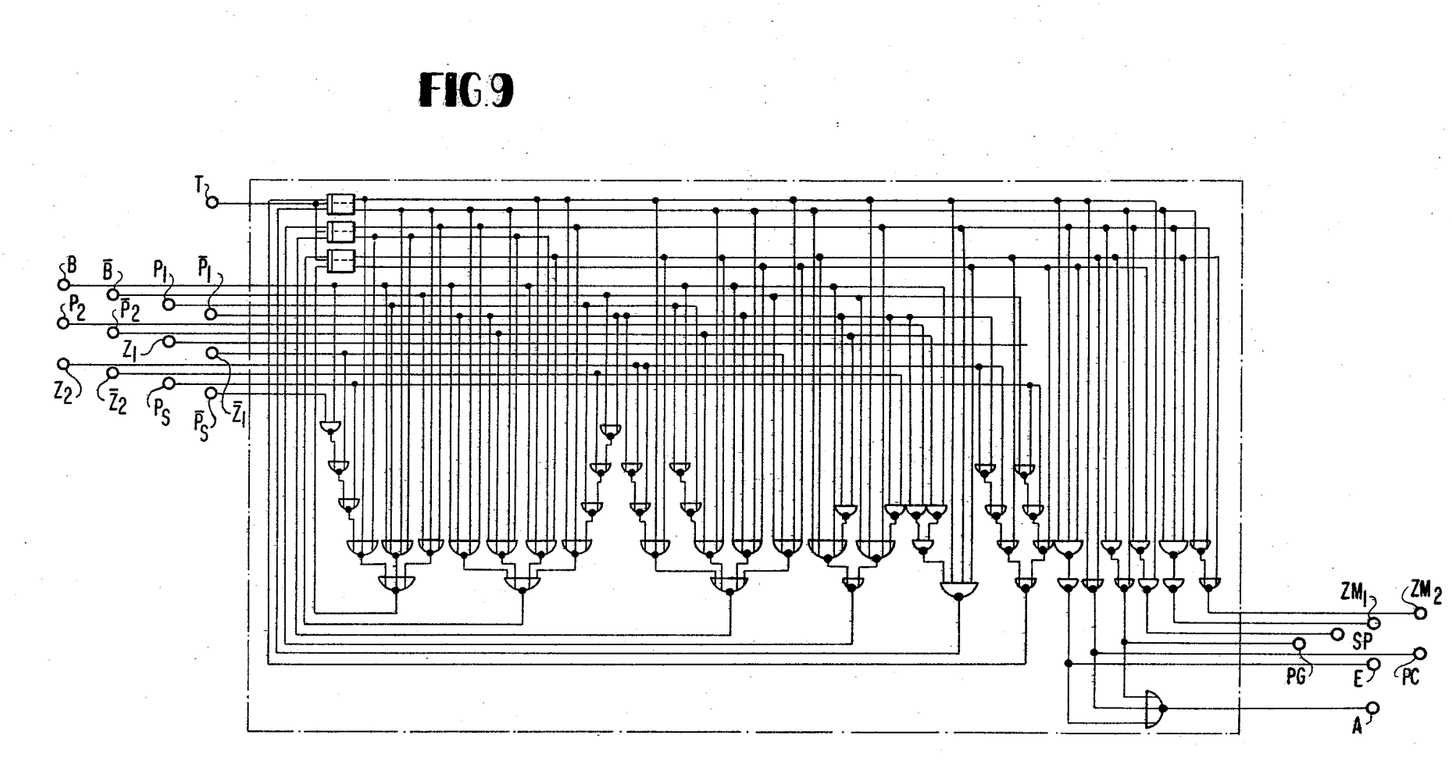
FIG. 9 is a block diagram arrangement of the processing device of a brake force controller according to FIG. 8.

FIG. 9 shows, by way of example, a circuit diagram of an electronic control circuit for this brake force controller. In this circuit, exclusively by means of logic interconnections, the starting signals A, PC, PG and E for the valve operation, SP for storing the pressure, and ZM1 and ZM2 for the time counting procedure are formed in NAND- and NOR-elements and in three storage elements from the digital signals representing variables B, $P_1$, $P_2$, $P_S$, $Z_1$ and $Z_2$ and their complements as well as a timing signal T. The members for obtaining the digital signal variables discussed above serving as inputs to the circuit of FIG. 9 and the valve controllers responsive to the output signals of FIG. 9 are constructed in a manner known to those skilled in the art and are therefore not disclosed in detail herein.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A brake force control device for vehicles with a back-control means reducing the brake pressure of the pressure control medium upon exceeding a maximum circumferential wheel force acting at a wheel and with disengagement of the back-control means with a redecreasing force after repassing through the maximum circumferential wheel force, the brake force control device including means for controlling the engagement and disengagement of the back-control means by signals including signal producing means for forming the signals in consideration of at least the sign of the derivative with respect to time of the circumferential wheel force acting on the wheel, the back-control means causing a reduction of the wheel cylinder brake pressure to be initiated with an increase of wheel cylinder brake pressure relative to master cylinder brake pressure and a decreasing circumferential wheel force only if prior thereto both circumferential wheel force and said relative brake pressure increased, and is turned off with a decrease of wheel cylinder brake pressure relative to the master cylinder brake pressure and a decreasing circumferential wheel force only if prior thereto the circumferential wheel force increased with said decreasing relative brake pressure, the signal producing means producing at least the signal B in response to signals representing the circumferential force acting at the wheel, where $B = 1$ if $dU/dt > 0$, $B = 0$ if $dU/dt < 0$, and $B_n = N_{n-1}$ if $dU/dt = 0$ with U being the circumferential wheel force acting at the wheel, and the signal $P_1$ in response to signals representing pressure in the master brake cylinder and pressure in the wheel brake cylinder where $P_1 = 1$ if $P_H < P_R$ and $P_1 = 0$ if $P_H \geq P_R$ with $P_H$ being the pressure in the master brake cylinder and $P_R$ being the pressure in the wheel brake cylinder for causing the backcontrol means to effect control conditions of rapid pressure increase, pressure decrease, pressure maintained and gradual pressure increase in accordance with the signals.

2. A brake force control device according to claim 1, wherein the back-control means is responsive to the signals B and $P_1$ for causing a pressure decrease control condition $b$ after a rapid pressure increase control condition $a$ if $B = 0$ and $P_1 = 0$ and maintaining the rapid pressure increase control condition $a$ if $B = 1$; for causing a pressure maintained control condition $c$ after condition $b$ if $B = 1$ and for maintaining condition $b$ if $B = 0$; for causing a rapid pressure increase control condition $d$ after condition $c$ if $B = 0$ and for maintaining condition $c$ if $B = 1$; for causing a gradual pressure increase control condition $e$ after condition $d$ if $B = 1$ and for maintaining condition $d$ if $B = 0$; for causing a rapid pressure increase control condition $f$ after control condition $e$ if $B = 0$ and $P = 1$, for causing the control condition $b$ after condition $e$ if $B = 0$ and $P = 0$ and maintaining condition $e$ if $B = 1$; and for causing control condition $a$ after condition $f$ if $B = 1$ and maintaining condition $f$ if $B = 0$.

3. A brake force control device according to claim 2, wherein the signal producing means further produces signals $P_2$ where $P_2 = 1$ if $P_R - P_{Gr} < 0$ and $P_2 = 0$ if $P_R - P_{Gr} \geq 0$ and $P_2 = 0$ if $P_R - P_{Gr} \geq 0$ with $P_{Gr}$ being a predetermined critical lower pressure limit value for the pressure of the wheel brake cylinder; $P_S$ where $P_S = 1$ if $P_R - P_{Sp} < 0$ and $P_S = 0$ if $P_R - P_{Sp} < 0$ with $P_{Sp}$ being the pressure value of the wheel brake cylinder stored when the maximum is exceeded; and $Z_2$ where $Z_2 = 0$ if $t_b + t_c \leq t_{max2}$ and $Z_2 = 1$ if $t_b + t_c > t_{max2}$ with $t_b$ being the time in which the control condition $b = $ pressure decrease is effective and $t_c$ being the time in which the succeeding control condition $c = $ pressure maintained is effective with respective to a predetermined maximum time interval $t_{max2}$, and a timing signal T for enabling measurement of the time intervals being supplied to the brake force control device.

4. A brake force control device according to claim 3, wherein the back-control means is further responsive to the signals $P_2$, $P_S$ and $Z_2$ for causing a pressure maintained control condition $g$ after condition $b$ if $B = 0$ and $P_2 = 1$ and for maintaining condition $b$ if $B = 0$ and $P_2 = 0$; for causing condition $c$ after condition $g$ if $B = 1$, for maintaining condition $g$ if $B = 1$, for maintaining condition $g$ if $B = 0$ and $Z_2 = 0$, and for causing condition $f$ if $B = 0$ and $Z_2 = 1$; for causing condition $a$ after condition $c$ if $B = 1$ and $Z_z = 1$ and for maintaining condition $c$ if $B = 1$ and $Z_2 = 0$; and for causing condition $b$ after condition $d$ if $B = 0$ and $P_S = 1$ and for maintaining condition $d$ if $B = 0$ and $P_S = 0$.

5. A brake force control device according to claim 4, wherein the back-control means is further responsive to the signal for causing control condition $g$ after condition $b$ if $B = 0$, $P_2 = 1$ and $P_1 = 0$; for causing condition $f$ after condition $b$ if $B = 0$, $P_2 = 1$ and $P_1 = 1$; for causing condition $f$ after condition $g$ if $B = 0$, $Z_2 = 0$ $P_1 = 1$ and for maintaining condition $g$ if $B = 0$, $Z_2 = 0$ and $P_1 = 0$; and for causing condition $a$ after condition $c$ if $B = 1$, $Z_2 = 0$ and $P_1 = 1$ and for maintaining condition $c$ if $B = 1$, $Z_2 = 0$ and $P_1 = 0$.

6. A brake force control device according to claim 5, wherein the signal producing means further produces the signal $Z_1$ where $Z_1 = 0$ if $t_d \leq t_{max1}$ and $Z_1 = 1$ if $t_d > t_{max1}$ with $t_d$ being the time in control condition $d$ is effective and $t_{max1}$ a predetermined maximum time interval therefor.

7. A brake force control device according to claim 6, wherein the back-control means is further responsive to signal $Z_1$ for causing control condition $e$ after control condition $d$ if $B = 1$ and $Z_1 = 0$; and for causing control condition $a$ after control condition $d$ if $B = 1$ and $Z_1 = 1$.

8. A brake force control device according to claim 7, wherein the signal producing means produces digital signals and the back-control means includes logic circuit means responsive to the digital signals.

9. A brake force control device according to claim 5, wherein the signal producing means further produces the signal $P_3$ where $P_3 = 1$ if $P_R - P_{Sch} < 0$ and $P_3 = 0$ if $P_R = P_{Sch} > 0$ with $P_{Sch}$ being a selectable lower pressure limit value for the wheel brake cylinder.

10. A brake force control device according to claim 9, wherein the back-control means is further responsive to signal $P_3$ for causing control condition $e$ after control condition $d$ if $B = 1$ and $P_3 = 0$; and for causing control condition $a$ after control condition $d$ if $B = 1$ and $P_3 = 1$.

11. A brake force control device according to claim 10, wherein the selectable pressure limit value for $P_{Sch}$ is equal to the predetermined critical limit value $P_{Gr}$ such that the signal $P_2$ is utilizable in place of the signal $p_3$ and the back-control means is further responsive to signal $P_2$ for causing control condition $e$ after control condition $d$ if $B = 1$ and $P_2 = 0$; and for causing control condition $a$ after control condition $d$ if $B = 1$ and $P_2 = 1$.

12. A brake force control device according to claim 1, wherein the signal producing means further produces signals in response to at least one of a predetermined critical limit value of pressure in the wheel brake cylinder, a pressure in the wheel brake cylinder which is stored when the maximum is exceeded, a predetermined time interval for one predetermined control condition to be effective, a predetermined time interval for two successive control conditions to be effective, and a timing signal for measuring the predetermined time intervals.

* * * * *